United States Patent [19]

Mariotti

[11] Patent Number: 5,431,200

[45] Date of Patent: Jul. 11, 1995

[54] APPARATUS FOR DELIVERING METERED QUANTITIES OF A FLUID SUBSTANCE

[75] Inventor: Luigi Mariotti, Venegono Superiore, Italy

[73] Assignee: I.A.S. Industrial Automation, Como, Italy

[21] Appl. No.: 212,994

[22] Filed: Mar. 15, 1994

[30] Foreign Application Priority Data

Mar. 17, 1993 [IT] Italy ............... MI93A0511

[51] Int. Cl.$^6$ ................. B65B 1/30; B65B 3/26
[52] U.S. Cl. .................... 141/83; 141/128; 141/198
[58] Field of Search ........ 141/83, 128, 90–92, 141/192, 198, 102, 103, 100, 67

[56] References Cited

U.S. PATENT DOCUMENTS

| 3,191,642 | 6/1965 | Sauto | 141/128 |
| 3,887,110 | 6/1975 | Porter | 141/102 X |
| 4,018,671 | 4/1977 | Andon et al. | |
| 4,527,377 | 7/1985 | Hayashi et al. | 141/90 X |
| 4,630,654 | 12/1986 | Kennedy, Jr. | 141/83 |
| 4,703,780 | 11/1987 | Reeves et al. | 141/1 |
| 5,131,440 | 7/1992 | Quinn | 141/90 X |
| 5,148,841 | 9/1992 | Graffin | 141/83 |
| 5,219,008 | 6/1993 | Shannon | 141/83 |
| 5,234,035 | 8/1993 | Nesser | 141/104 X |
| 5,318,078 | 6/1994 | Hartmann | 141/83 X |

FOREIGN PATENT DOCUMENTS

| 0412598 | 2/1991 | European Pat. Off. | |
| 0477811 | 4/1992 | European Pat. Off. | |
| 3643699 | 3/1988 | Germany | 141/128 |

*Primary Examiner*—Robert M. Fetsuga
*Assistant Examiner*—Steven O. Douglas
*Attorney, Agent, or Firm*—Young & Thompson

[57] ABSTRACT

An apparatus for delivering metered quantities of a fluid substance into a container, under the control of a programmable process unit, and a weighing device; a main storage tank is provided to fill by gravity a pressurizable auxiliary vessel connected to the inlet of delivery valves having different flow rates. The process unit is programmed to modulate the flow rates and to control the delivery time of the valves as a function of control signals received from a weighing device; the auxiliary vessel is hermetically sealed and connected to an air pressure source, to provide a constant pneumatic head in the vessel under the control of the process unit, at each delivery.

3 Claims, 1 Drawing Sheet

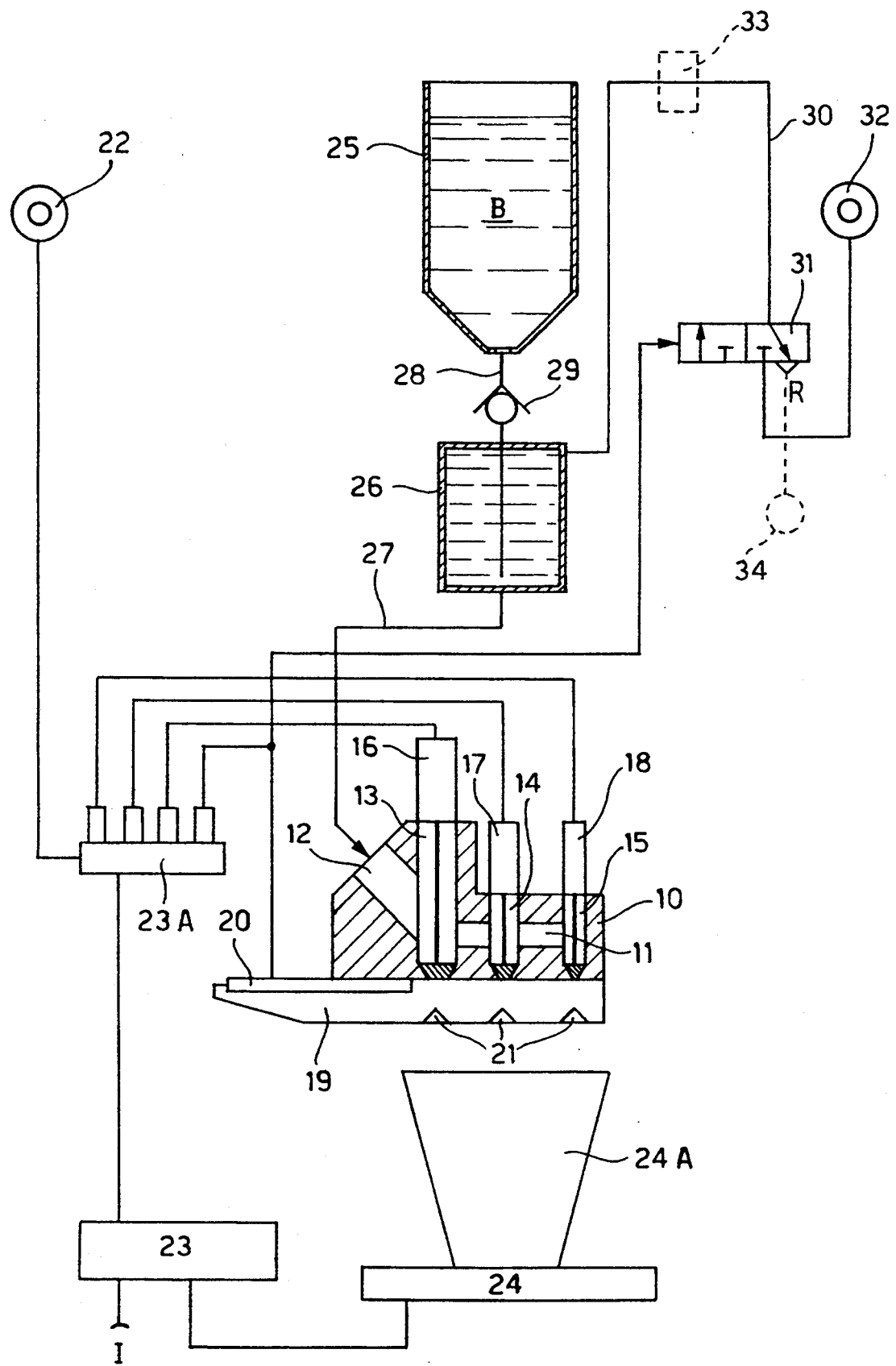

APPARATUS FOR DELIVERING METERED QUANTITIES OF A FLUID SUBSTANCE

BACKGROUND OF THE INVENTION

The present invention relates to an apparatus for delivering fluid substances in metered quantities, wherein metering is performed by weight control of the delivered substance. The invention is above all applicable in the preparation of dyeing agents used in printing or dye works although other applications are possible for which accurate controls and extreme precision of the delivered quantities of fluid substances having high viscosity, are required.

In preparing coloring or dyeing substances, particularly for dyeing works, fluid components are used as a basis for a dyeing substance which must be mixed together in metered quantities, strictly observing the required tolerances. Generally use is made of special delivering devices provided with motor-driven valves, to carry out weight control by modulating the flow rates of components and controlling the delivery times of the valves.

In general the flow rate may be modulated by appropriately varying the outflow from a valve, or by providing separate delivery valves having different flow rates; the valves are sequentially opened for predetermined lengths of time, under the control of a programmable process unit which receives control signals from a weighing device.

In weight metering systems which make use of flow modulating valves, wherein the weight is controlled by gradually reducing the flow of the substance to be metered, the final adjustment of the weight is the most delicate phase, in that it can be easily affected by many external factors, such as the viscosity of the fluids temperature and, mainly, pressure or hydraulic head acting on the delivery device.

In traditional apparatus, in which the substances are simply delivered by gravity, the delivery device is directly connected to a storage tank of adequate capacity, positioned at a predetermined height above the delivering device on a support structure. Since the flow rate delivered by the device is a direct function of the hydraulic head which acts on the delivery device itself, clearly in systems of this kind considerable variations in flow may occur, particularly in the final weight adjustment phase, given that the hydraulic head changes as the filling conditions of the storage tank vary.

In systems of this kind constant care and attention is required to prevent excessive lowering of the level of fluid in the storage tank, without nevertheless eliminating the inherent limitations and defects of these systems.

In place of normal gravity delivery systems, generally preferred due to their constructional simplicity, the use of reciprocating positive-displacement pumps has been proposed. However the use of positive-displacement pumps in combination with delivery devices having modulated flow rates, involves extremely complex management of the whole system, since the feed flow rate of the pumps must in turn be modulated correspondingly to the modulation of the flow rates of the delivery system. It is in fact clear that, if the flow rate of the feed pump remains constant, when the flow rates of the delivery heads vary, differences in pressure would arise which would introduce further causes for error. Moreover, the use of reciprocating positive-displacement pumps does not allow to have a constant hydraulic head and an absolutely constant flow rate, particularly when the reciprocating movement of the piston is reversed, since when the stroke is reversed, there is an interruption in the supply or in any case an irregularity in the feeding phase which may jeopardize or have a negative effect in the final phase of weight adjustment of delivered substance.

Therefore, even those systems which use positive-displacement pumps for feeding and delivering fluid substances, in addition to being extremely complex to handle and high in cost, do not solve the problem of control and of perfect weight metering of the delivered substances.

A typical example of prior known apparatus for automatically metering fluid substances for dye or printing works, which makes use of metering valves directly connected to respective storage tanks, or by pumping devices, is disclosed in EP-A-412 598 which constitute the nearest prior art.

EP-A-477 811 and U.S. Pat. No. 4,018,671 disclose pressure delivery systems in which a pressurized vessel holding a volume of the substance to be delivered, is connected to an air or gas supply and to a storage tank respectively. More particularly, EP-A 477 811 discloses a metering system for delivering liquid substance for use in applications such as liquid chromatography or similar applications in which the volumes of liquid being handled are quite small being of the order of micro liters, and in which the delivered liquid has a substantially low viscosity. Furthermore, according to said document the chromatography liquid solvent is metered under pressure and volume controlled conditions in an elongated vessel comprising upper or low level detectors for a known volume of the liquid; the time taken for the liquid to fall from the upper to a lower detected levels gives a measure of the rate of the delivered liquid; no weigh control or modulation of the delivery is suggested or performed in the apparatus. U.S. Pat. No. 4,018,671 discloses an intermitted catalyst addition system in the field of hydrocarbon conversion and related process or apparatus, in which an addition hopper is filled by gravity from a storage tank and utility air is supplied to the same hopper and to a catalyst carrier line, in air conveyor systems.

None of the above prior art suggests or makes obvious the use of a pressure-aided gravity delivering system in combination with a particular modulating valve delivering device particularly suitable for dye and printing works of extreme simplicity and having high control degree according to present invention.

OBJECTS OF THE INVENTION

The present invention is based on the adequate use of a pressure-aided gravity feed system, which is able to maintain a constant pressure head on modulating delivery valves, and which guarantees a high control degree of the delivered quantities for perfect weight metering, using an extremely simple, reliable and low-cost apparatus.

Therefore, the main object of the present invention is to provide an apparatus for the controlled delivery of metered quantities of fluid substances in dye and textile printing fields, to achieve the referred advantages, that is to say suitable for guaranteeing a high control degree in delivering metered quantities, by predetermined flow and delivery time conditions, while allowing strictly controllable weight meterings.

A further object of the invention is to provide an apparatus of the kind mentioned above which is able to guarantee a constancy of the pressure head on a delivery valve device, maintaining an extreme simplicity of management and low cost of the entire apparatus.

SUMMARY OF THE INVENTION

The above is achieved by an apparatus for delivering metered quantities of a fluid substance, by using an auxiliary pressure-aided vessel having a comparative small volume, equal to or slightly greater than the maximum volume which can be delivered for each metering operation, whose filling by gravity and pressurization conditions are controlled by a process unit each delivery time, in combination with a valve delivery device having sequentially actuable modulating valves for delivering said substance at different flow rates.

The proposed solution is extremely reliable compared to standard gravity or pump-actuated delivery systems: it is extremely economical also, since it allows small-sized pressurized tanks to be used, which can be produced by simple mechanical machining operations, from commercially available tubular elements, and which can be pressurized with extremely low costs compared to the costs of pressurizing larger-sized tanks. In fact, if account is taken of the fact that in preparing colors for printing or dyeing fabrics, systems comprising several hundreds of large-volume tanks, of the order of 200 or more liters, which would require expensive processes to be pressurized, are requested, it is clear that the use of small-volume pressure-aided tanks, which can be obtained from simple pipes of adequate thickness, enables the required results to be achieved at extremely low cost, maintaining a high degree of reliability for the whole apparatus.

The invention may be adopted in apparatus for delivering and metering individual components, or for delivering and metering several components in an automatic plant using a plurality of delivery devices arranged along a linear path for a container moved on a conveyor or by a self-propelled trolley provided with weighing means.

BRIEF DESCRIPTION OF THE DRAWING

The invention will be illustrated in greater detail hereinbelow with reference to the figure of the accompanying drawing which represents an example of a preferred embodiment according to the principles and of the general features of the invention.

DETAILED DESCRIPTION OF THE INVENTION

As shown in the drawing, the apparatus substantially comprises a valve-modulating delivery device 10 having a feeding chamber 11 provided with an inlet aperture 12 and with three metering valves 13, 14, 15 provided with modulating plug members connected to respective linear actuators consisting, for example, of pneumatic cylinders 16, 17 and 18 suitably operated to sequentially modulate opening and closing of the same metering valves.

Reference 19 in the example moreover denotes a washing box slidingly supported below the delivery device 10 which may be advanced or retracted through the action of a drive cylinder 20, to be moved between a forward or closure position, shown in the figure, wherein spray nozzles 21 appropriately connected to a water supply system wash the outlet openings of the metering valves 13, 14 and 15, and a backward or opening position corresponding to the delivery condition of the device 10.

The pneumatic actuators of the delivery device 10 are therefore sequentially connected to a pressurized air source 22 via a valve assembly 23A controlled by a programmable process unit 23. The process unit 23 receives data control signals from a weighing device 24 whereon a receiving container 24A is placed, which may be positioned beneath the delivery device 10.

The inlet 12 of the delivery device 10 according to the present invention, is connected to a pressure-aided gravity delivering system suitably to maintain a constant pressure head to deliver a fluid substance B in a precise and controlled manner, in metered quantities, actuating in sequence and for determined lengths of time, the delivery valves 13, 14 and/or 15 of the device, under the control of the process unit 23. The fluid substance to be delivered, denoted by B, is stored in a main storage tank 25 of comparatively large dimensions, for example having a volume of 200 liters, which discharges by gravity into an auxiliary vessel 26 positioned at a lower level and having a volume considerably smaller than that of the storage tank 25. The vessel 26 is hermetically sealed and can be discharged by a pressure-aided and gravity combined system as appropriately explained hereinunder.

In general it is advisable that the volume of the auxiliary tank 26 be equal to or slightly greater than the volume necessary for metering the maximum quantity of substance which can be delivered by the device 10. The auxiliary vessel 26 is therefore directly connected, via a conduit 27, to the inlet aperture 12 of the delivery device 10 while it is connected to the bottom of the storage tank 25 via piping 28 comprising a check valve 29 which allows the substance B to flow by gravity towards the auxiliary vessel 26, preventing its return towards the tank 25.

As previously referred, the small vessel 26 is pressure-aided to discharge a metered quantity of the substance B, appropriately connecting vessel 26 to a constant pressure source to pressurize the same vessel 26, during each delivery, to a constant pressure value, for example of the order of 0.5 bar, to create in the chamber 11 of the delivery device, a pressure head having a controlled and constant value, considerably greater than the hydraulic head in the tank 26, and in any case wholly independent and not affected by the hydraulic head variations in the main storage tank 25. Therefore the auxiliary vessel 26 is connected, by piping 30 and a control valve 31, to a source 32 of pressurized air of an appropriate pressure value. The control valve 31, for example of the sliding type, is automatically actuated before each delivery, by a control signal directly or indirectly provided by the process unit 23, for example by a pneumatic signal provided by branching off the control inlet port of the valve 31, from the feeding conduit connected to the valve of the assembly 23A which controls opening and closure of the slide box 19 for washing the delivery device 10. In this way, each time opening and closure of the slide box 19 is actuated, switching of the control valve 31 is simultaneously commanded. Reference 34 in the figure indicates a vacuum source optionally connected to the venting port of valve 31 to assist the filling of vessel 26 with highly viscous fluids.

In order to maintain the two fluids, namely the fluid substance B in the tank 25, and the pressurized air in the piping 30 separated, suitable separation means have to be provided, for example by extending the piping 30 with an upwardly oriented loop higher than the maximum level of the substance in the main tank 25, or by providing the piping 30 with a suitable self-actuated fluid separating device, schematically denoted by 33.

The apparatus described works substantially as follows: it is supposed that the apparatus is initially in the conditions shown in the figure wherein the valves of the delivery device 10 are closed, the auxiliary vessel 26 is already filled, the control valve 31 being switched to the venting port R to allow the filling by gravity of the auxiliary vessel 26 by the main tank 25. In these conditions the auxiliary vessel 26 is not yet connected to pressure source 32.

It is now supposed that the process unit 23, via a signal received at the inlet I, enables the apparatus for the delivery of a metered quantity of the substance B which has to be collected in the container 24A, and weighed with extreme accuracy by the scales 24. It is finally supposed that the delivery of the substance B occurs by sequentially modulating the opening of the three valves 13, 14 and 15 of the delivery device. Therefore the process unit 23, through the valve assembly 23A, will first command the opening of the slide box 19 to prepare the device 10 for delivery, and simultaneously will switch the control valve 31, to connect the auxiliary vessel 26 to the pressurized air source 32. The check valve 29 between the tank 25 and vessel 26 will prevent backflux of air and fluid from the vessel 26 to the tank 25, maintaining a pressurized condition, for example of 0.5 bar, in the auxiliary vessel 26 for pressure-aiding the discharging of a metered quantity of substance B from the same vessel 26.

Subsequently, when the auxiliary vessel 26 has been pressurized, the process unit 23 will command the opening of the first valve 13 of the delivery device 10, for a predetermined length of time so that most of the quantity of substance to be delivered is fed at a first flow rate, under the control of the scales 24; during this first delivering phase, the opening of the valve 13 may be suitably modulated under the control of the process unit 23.

Having completed this first delivering phase, the valve 13 will be closed while the second valve 14 will be opened and modulated, again for a length of time predetermined by the process unit 23, so as to perform a phase of rough adjustment of the weight at a second flow rate lower than the first one, while maintaining the tank 26 in pressurized conditions.

Having completed this first adjustment phase of the weight, the process unit 23, on the basis of the information received from the scales 24, and on the basis of the process program entered therein, will calculate the missing weight and control the opening of the third modulating valve 15, at a third flow rate lower than the first and second ones for a time necessary to complete the adjustment of the weight for the delivery of the total required quantity of the substance. The last part or final adjustment of the metering step, as referred previously, is the most delicate phase and the most sensitive to possible variations in the internal or external parameters of the system, more particularly in the hydraulic head or feeding condition of the fluid substance at the delivery device 10. Nevertheless, as referred, this last phase of final adjustment also occurs in a pressure-aided condition by maintaining the tank 26 at the same constant pressurization value supplied by the pressurization source 32.

Although the auxiliary vessel 26 has been partially emptied during the previous delivery phases reducing its hydraulic head, due to gravity action of the substance in the same vessel, by appropriately defining the pressure value of the source 32, according to the volume of the same auxiliary vessel 26, it is possible to make the hydraulic head variations inside this vessel totally negligible in relation to the pressurization value of the air source 32. For example, from tests performed in metering coloring agents for printing fabrics, use was made of storage tanks 25 with a capacity of the order of 200 liters and auxiliary vessel 26 with a capacity of the order of 15 liters having an inherent hydraulic head of 300 millimeters of water column, which was wholly negligible in relation to an air pressure of 0.5 bar corresponding to approximately 5000 millimeters of water column.

It is therefore clear that in these conditions the variation in the inherent hydraulic head of the vessel 26 was totally ineffectual or negligible in respect of the pressurization. In this way the final adjustment phase of the weight, in delivering a metered quantity of the substance B, may take place in an extremely precise manner, without any substantial influence by internal or external parameters of the system, ensuring extreme precision and reliability of weighing in time. When the process unit 23 receives from the scales 24 a signal that the weight has been correctly achieved, it commands the closure of the valve 15 and the closure of the slide box 19 to allow washing by the nozzles 21, and also switches to the venting side the control valve 31, which in this way depressurizes the tank 26, or to connect the same to the vacuum source 34 allowing it to be filled once again, through gravity, by the main tank 25.

The use of a supplementary pressurized vessel of small volume in the apparatus of the kind described in combination with valve actuated delivery device 10 allows the further advantage of reducing the space occupied by the same apparatus and the overall costs due to the possibility of arranging the tank 25 and vessel 26 one next to the other, at floor level, thus eliminating the need to provide bulky and expensive metal support structures, normally present in traditional delivery systems for raising the storage tanks to the heights required for achieving sufficient hydraulic head. According to the invention, the position of the main tank 25 is now fully independent from the position of the delivery device 10 since the hydraulic head in the same device is artificially created by pressurization of the auxiliary vessel 26. In this way an apparatus is obtained which combines features of extreme reliability and precision with features of low cost and economical handling.

What is claimed is:

1. Apparatus for delivering metered quantities of a fluid substance into a receiving container on a weighing means, for dye and printing works, comprising:
   a main storage tank for said substance, having a large volume;
   a delivering valve device for delivering a metered quantity of said substance, a programmable process unit for actuating said valve device, and weighing means to provide weighing data to said process unit;
   a pressure-aided auxiliary vessel between the main tank and the delivery device, said auxiliary vessel having a volume comparatively smaller than the volume of the main tank;

a check valve between the auxiliary vessel and the storage tank to prevent back-flow from the vessel;

and air control valve means for connecting the auxiliary vessel to an air pressure source, said air control valve means being operatively connected to said process unit;

said delivering valve device comprising delivery valves having different flow rates;

said process unit being programmed for controlling the opening and the closing condition of said air control valve means and for sequentially actuating said delivery valves according to data signals received from said weighing means.

2. Apparatus according to claim 1, said delivering valve device comprising a slide box having spray nozzles for washing the delivering valves, a fluid actuated control cylinder connected to said slide box and having a pressure feeding conduit, to move said slide box between forward and backward positions; said control valve means for connecting the auxiliary vessel to said air pressure source comprising a pneumatically actuated control valve having a pressure signal inlet port, and a conduit branched off from the fluid pressure feeding conduit of the control cylinder of said slide box and connected to said pressure signal inlet port.

3. Apparatus according to claim 1, further comprising conduit means for connecting the auxiliary vessel to said air pressure source, said conduit means including fluid separation means for maintaining a separation between the fluid substance in the auxiliary vessel, and the pressurized air.

* * * * *